Figure 1:
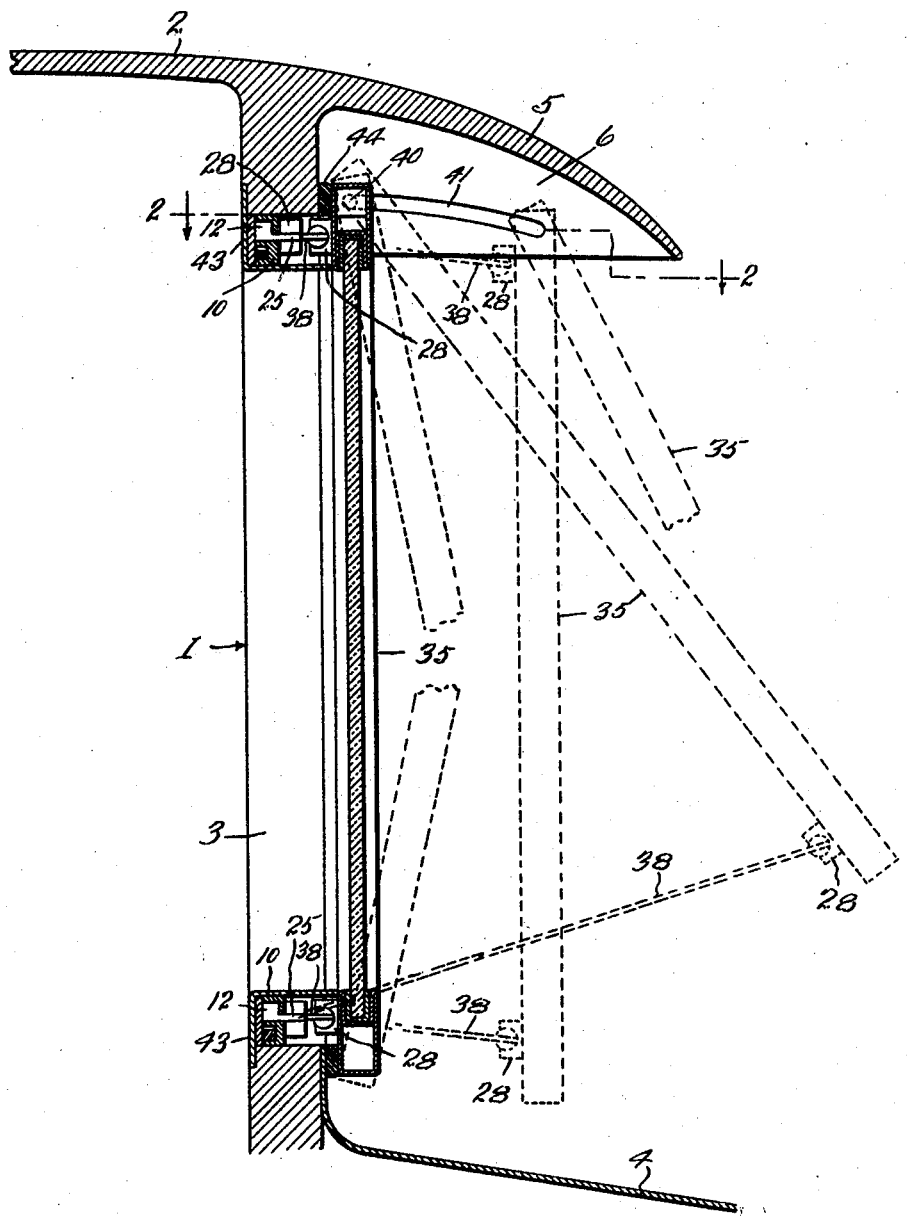

July 1, 1930. A. B. BEITMAN 1,769,172
WINDSHIELD AND ADJUSTING MECHANISM THEREFOR
Filed Oct. 15, 1926  2 Sheets-Sheet 1

Inventor
Albert B. Beitman
By Hull, Brock & West
Attorney

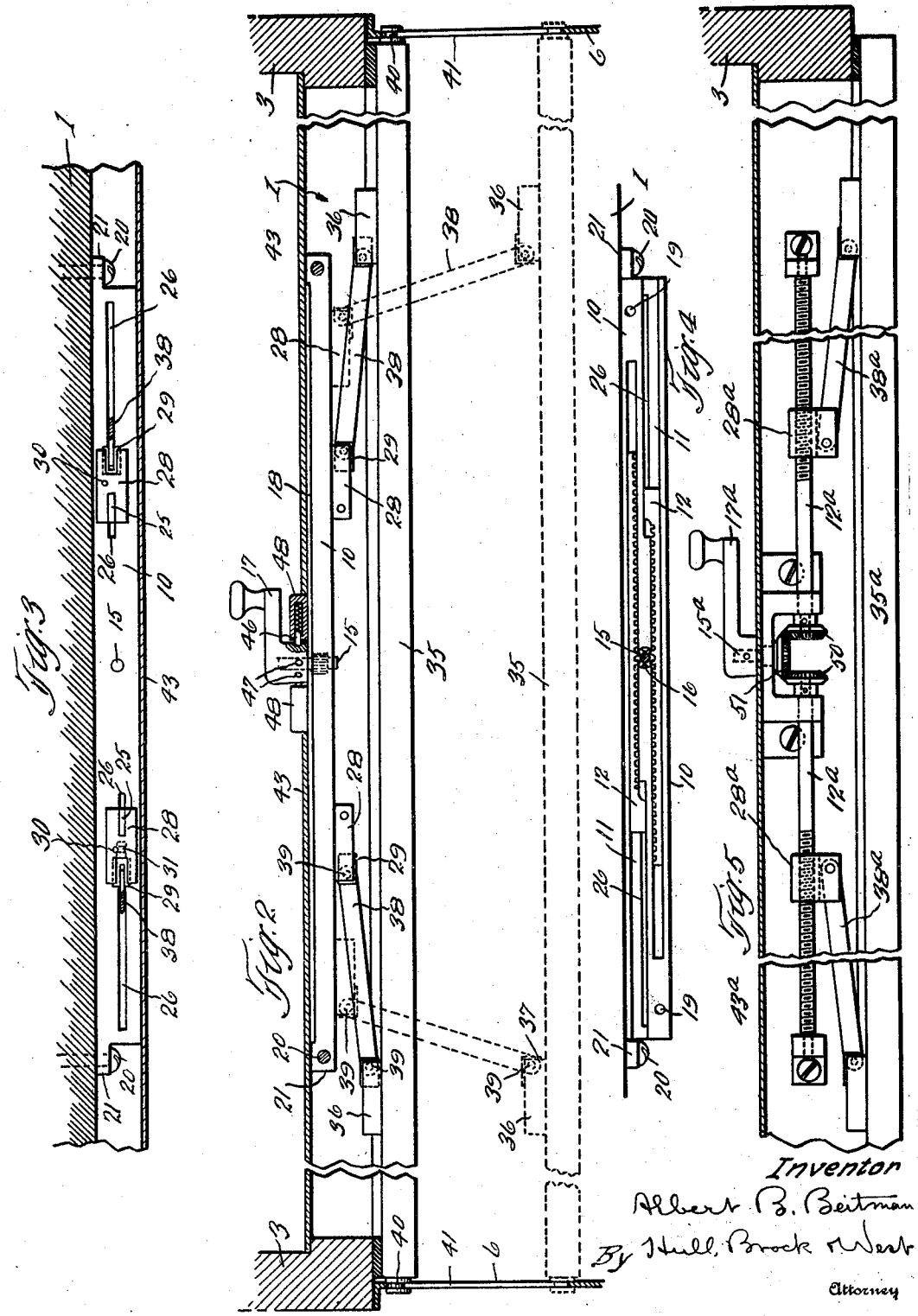

Patented July 1, 1930

1,769,172

UNITED STATES PATENT OFFICE

ALBERT B. BEITMAN, OF CLEVELAND HEIGHTS, OHIO

WINDSHIELD AND ADJUSTING MECHANISM THEREFOR

Application filed October 15, 1926. Serial No. 141,719.

My present invention has to do with improvements in the type of windshield for motor vehicles and the like disclosed in my copending application Serial No. 128,576, filed August 11, 1926, and relates further to operating mechanism therefor, said mechanism being adapted for use as well with windshields that are hingedly supported in the ordinary manner.

The objects of my invention are to refine the construction of the windshield disclosed in my above mentioned application, and to provide efficient, reliable and durable mechanism for adjusting the windshield, that is particularly easy and convenient of use, which effects a quick adjustment, and that positively holds the windshield in any of its adjusted positions.

The foregoing objects, with others hereinafter appearing, are attained in the embodiments illustrated in the accompanying drawings wherein Fig. 1 is a vertical section from front to rear through the forward portion of an enclosed vehicle body incorporating my invention; Fig. 2 is a sectional plan substantially on the line 2—2 of Fig. 1; Fig. 3 is a partial sectional front elevation of the windshield adjusting mechanism; Fig. 4 is a rear elevation of said mechanism with the cover of the casing removed; and Fig. 5 is a sectional plan view of a modification.

The front frame of the vehicle body, which surrounds the windshield opening, is designated 1. This frame joins the top 2 at its upper edge, corner posts 3 at its lateral edges, while the cowl 4 extends forwardly from its lower edge. The top 2 is shown as extended forwardly of the frame 1 to provide a visor 5 that is supported at its ends, in the usual manner, by brackets 6.

Secured to the top and bottom members of the frame 1 are substantially identical windshield operating mechanisms each of which includes a casing 10. This casing is shown as formed of an elongated block or heavy strip of material within the rear face of which are milled or otherwise formed ways 11 within which racks 12 are guided, the racks being enlarged at one of their ends, and the ways being correspondingly widened to accommodate the enlargements, all of which will appear clearly from Fig. 4. A spindle 15 is journaled within suitable bearings in the casing 10 at about the transverse center thereof and formed integral with or secured to the spindle is a pinion 16 which meshes with the racks 12. The spindle 15 projects rearwardly of the casing and has applied to it an operating handle or crank 17 and when the spindle is rotated by means thereof it will, through said pinion, move the racks 12 longitudinally of the ways 11. A cover 18 is secured to the rear side of the casing 10, as by screws that are accommodated by holes 19 in the casing, appearing in Fig. 4. The casing, in turn, is fastened to the adjacent member of the frame 1 by fastening means 20, such as screws, that are engaged through apertured lugs 21 that project from opposite ends of the casing.

Fins 25 extend forwardly from the enlarged ends of the racks 12 through slots 26 in the front wall of the casing and support beyond said walls blocks 28, said blocks sliding upon the casing as the racks are reciprocated. Mounted for oscillation in sockets that are formed in the outer ends of the blocks 28 are swivel heads 29, and these heads may be held against withdrawal from the sockets by pins 30 or the like that are driven into the blocks 28 and cooperate with grooves 31 (Fig. 3) in shanks of the swivel heads that extend into bores of the blocks 28 inwardly of the sockets.

The windshield sash is designated 35, and to the inner sides of the top and bottom members of the sash frame are secured blocks 36 within which are mounted swivel heads 37 like those previously described. The swivel heads 29 and 37 are bifurcated, and links 38 have their opposite ends engaged within the bifurcations of said heads and pivoted upon pins 39 that extend through the heads. The windshield sash is thus connected to the operating mechanisms at top and bottom. To support the sash at a proper elevation, trunnions 40 extend laterally from the upper corners of its frame through slots 41 in the brackets 6, and these trunnions may be equipped with rollers or other anti-friction bearings in accordance with common mechanical expediency.

The casings 10 are enclosed within sheaths 43 that are applied to the top and bottom members of the frame 1. Strips 44 of suitable packing material, such as rubber, are arranged about the outer side of the frame 1, and when the sash 35 is in closed position it bears against said strips thereby to effectively seal the joint between the sash and frame. To hold the mechanism in any position to which it is adjusted I provide one or more spring pressed plungers 46 which engage within depressions 47 on the hub of the operating handle or crank 17, said plungers with their springs being contained within housings 48 that are secured to the cover 18 of the casing 10.

By turning one of the handles or cranks 17, the racks 12 of the corresponding mechanism will be reciprocated within the casing thereby to move the blocks 28 that are carried by said racks in and out so as to correspondingly move the inner ends of the links 38 and through them adjust the adjacent edge of the sash 35 toward and from the frame. During the adjustments the sash is maintained at a proper elevation by the engagement of its trunnions 40 within the slots 41 of the visor brackets 6. The links 38 of the lower adjusting mechanism are preferably longer than those of the top mechanism so that the lower edge of the sash may be thrown a considerable distance forwardly of the frame 1, as indicated in dotted lines in Fig. 1, thereby to permit vision beneath the sash if such becomes necessary because of a coating of rain, sleet or ice on the windshield.

It is evident from what has been described that the adjusting mechanism is adapted for use with windshields that are hingedly connected at their upper edges to the windshield frame. This condition is virtually present in the disclosed construction when only the lower mechanism is operated because under such circumstances the windshield swings at its upper end on its trunnions 40.

It will be seen that in this case, as in the construction which constitutes the subject matter of my former application above referred to, the sash may be adjusted toward and from the frame at either top or bottom or both to effect ventilation at either or both of these points.

In Fig. 5 I have disclosed a modification of the adjusting mechanism wherein screws 12$^a$ are substituted for the racks 12 of the previous form and operating upon said screws are blocks 28$^a$ which are connected, through links 38$^a$, to the windshield sash 35$^a$. Secured to the inner ends of the screws 12$^a$ are beveled pinions 50 which mesh with a similar pinion 51 carried by the forward end of a spindle 15$^a$. An operating handle or crank 17$^a$ is secured to the end of the spindle 15$^a$ where it protrudes beyond the rear face of the sheath 43$^a$. By means of the handle 17$^a$ the screws 12$^a$ may be rotated to feed the blocks 28$^a$ inwardly and outwardly thereby to adjust the sash 35$^a$ through the intervention of the links 38$^a$. This construction has the advantage of positively holding, by virtue of the screws 12$^a$, in any position to which the mechanism is adjusted without the need of additional locking means, such as the plungers 46 of the previously described form.

Having thus described my invention, what I claim is:

1. In combination, a frame, a windshield sash movable toward and from the frame, a casing applied to one side of the frame and having ways that extend longitudinally of the frame, racks guided within said ways and arranged in opposed relation to each other, a pinion meshing with said racks, means for rotating the pinion thereby to simultaneously move the racks in opposite directions, and links pivotally connected at their opposite ends respectively to said racks and to the adjacent side of the sash.

2. In combination, a frame, a windshield sash movable toward and from the frame, a casing having parallel longitudinal ways therein and applied to one side of the frame, racks guided for movement within said ways and arranged in opposed relation to each other, a pinion meshing with said racks, means for rotating the pinion thereby to simultaneously move the racks in opposite directions, blocks slidable with respect to the casing, each of said blocks being connected to one of said racks, a link having one of its ends pivotally connected to each of said blocks, and a pivotal connection between the opposite end of each link and the adjacent side of the sash.

3. In combination, a frame, a windshield sash movable toward and from the frame, a casing secured to one side of the frame, said casing having longitudinal parallel ways in its rear side and slots opening from said ways through the front side of the casing, racks guided within said ways and arranged in opposed relation to each other, a pinion meshing with said racks, a spindle journaled within the casing and to which said pinion is fixed, means disposed rearwardly of the casing for rotating the spindle, a cover closing the rear side of the casing, fins projecting from the racks through the aforesaid slots, blocks carried by the fins forwardly of the casing, and links having their opposite ends pivotally connected respectively to said blocks and to the adjacent side of the sash.

4. In combination, a frame, a windshield sash movable toward and from the frame, a casing secured to one side of the frame, said casing having ways in its rear side and slots opening from said ways through the front side of the casing, racks guided within said ways and arranged in opposed relation to each other, a pinion meshing with said racks, a spindle journaled within the casing and to which said pinion is fixed, means disposed rearwardly of the casing for rotating the spindle, fins projecting from the rack through the aforesaid slots, blocks carried by the fins forwardly of the casing, links having their opposite ends pivotally connected respectively to said blocks and to the adjacent side of the sash, and means tending to retain the aforesaid spindle against rotation.

5. In combination, a frame, a windshield sash means bodily supporting the sash while permitting its opposite sides to move toward and from the frame, sash adjusting mechanisms situated on oposite sides of the frame, each mechanism comprising a casing having ways that extend longitudinally of the frame, racks guided within said ways and arranged in opposed relation to each other, a pinion meshing with said racks, means for rotating the pinion thereby to simultaneously move the racks in opposite directions, and links associated with each mechanism and pivotally connected at their opposite ends respectively to the racks of said mechanism and to the adjacent side of the sash.

In testimony whereof, I hereunto affix my signature.

ALBERT B. BEITMAN.